(12) United States Patent  
Powell

(10) Patent No.: US 8,218,567 B2  
(45) Date of Patent: Jul. 10, 2012

(54) METHOD AND SYSTEM FOR REDUCING TRANSCEIVER POWER VIA A VARIABLE SIGNAL CONSTELLATION

(75) Inventor: Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 818 days.

(21) Appl. No.: 11/859,429

(22) Filed: Sep. 21, 2007

(65) Prior Publication Data

US 2008/0225881 A1    Sep. 18, 2008

Related U.S. Application Data

(60) Provisional application No. 60/894,240, filed on Mar. 12, 2007, provisional application No. 60/917,870, filed on May 14, 2007.

(51) Int. Cl.  
*H04L 12/66* (2006.01)

(52) U.S. Cl. ......... 370/463; 370/252; 370/254; 370/465

(58) Field of Classification Search .................. 370/252, 370/352, 401, 463, 465, 538, 522, 254, 445; 375/222, 286, 259, 261, 271, 279–281, 302, 375/308, 260; 714/796  
See application file for complete search history.

(56) References Cited

U.S. PATENT DOCUMENTS

| | | | |
|---|---|---|---|
| 5,999,540 A * | 12/1999 | McGhee | 370/465 |
| 6,173,015 B1 * | 1/2001 | Eyuboglu et al. | 375/286 |
| 6,385,203 B2 * | 5/2002 | McHale et al. | 370/401 |
| 6,538,994 B1 | 3/2003 | Horspool | |
| 6,650,624 B1 * | 11/2003 | Quigley et al. | 370/252 |
| 6,724,829 B1 | 4/2004 | Tzuckerman | |
| 6,731,692 B1 * | 5/2004 | Bhoja | 375/286 |
| 6,763,097 B1 | 7/2004 | Vitenberg | |
| 6,795,450 B1 | 9/2004 | Mills et al. | |
| 6,807,227 B2 * | 10/2004 | Chien | 375/224 |

(Continued)

FOREIGN PATENT DOCUMENTS

EP    1 473 870    11/2004

(Continued)

OTHER PUBLICATIONS

Bennett et al., "Energy Efficient Ethernet", [Online] IEEE 802 Tutorial, Jul. 16, 2007, http://www.ieee802.org/802_tutorials/july07/IEEE-tutorial-energy-efficient-ethernet.pdf.

(Continued)

*Primary Examiner* — Hassan Kizou  
*Assistant Examiner* — Toan Nguyen  
(74) *Attorney, Agent, or Firm* — Farjami & Farjami LLP

(57) ABSTRACT

Aspects of a method and system for reducing transceiver power via a variable signal constellation are provided. In this regard, an Ethernet PHY device may receive one or more signals indicative of a current state of an Ethernet link to which the PHY device is coupled and/or indicative of resources, such as power, available to the PHY device. Accordingly, a number of points comprising a signal constellation utilized to communicate data via the Ethernet link may vary based on the one or more signals. A current state of the link may comprise a bit error rate, a packet error rate, and/or utilization, in terms of bandwidth for example, of the link. Aspects of the invention may enable controlling, at least in part, power consumption of the PHY device may altering the number of points comprising the signal constellation.

30 Claims, 7 Drawing Sheets

U.S. PATENT DOCUMENTS

| | | | |
|---|---|---|---|
| 6,853,637 B1* | 2/2005 | Norrell et al. | 370/352 |
| 6,856,597 B1 | 2/2005 | Scott | |
| 7,003,333 B2 | 2/2006 | Chow | |
| 7,050,517 B1 | 5/2006 | Sallaway et al. | |
| 7,116,682 B1 | 10/2006 | Waclawsky | |
| 7,308,058 B2 | 12/2007 | Zerbe et al. | |
| 7,315,967 B2 | 1/2008 | Azenko | |
| 7,406,106 B2* | 7/2008 | Mallory | 370/522 |
| 7,447,261 B2* | 11/2008 | Shearer et al. | 375/232 |
| 7,539,208 B2* | 5/2009 | Chapman et al. | 370/466 |
| 7,555,037 B2* | 6/2009 | Sedarat | 375/222 |
| 2002/0027985 A1* | 3/2002 | Rashid-Farrokhi | 379/417 |
| 2002/0172274 A1 | 11/2002 | Carlson | |
| 2003/0002519 A1* | 1/2003 | Terry et al. | 370/445 |
| 2003/0053493 A1* | 3/2003 | Graham Mobley et al. | 370/538 |
| 2003/0115541 A1* | 6/2003 | Azadet et al. | 714/796 |
| 2004/0006769 A1 | 1/2004 | Ansari et al. | |
| 2004/0008794 A1* | 1/2004 | McClellan | 375/260 |
| 2006/0034295 A1 | 2/2006 | Cherukuri et al. | |
| 2007/0280239 A1 | 12/2007 | Lund | |
| 2008/0049766 A1* | 2/2008 | Harrington et al. | 370/401 |
| 2008/0056284 A1 | 3/2008 | Powell et al. | |
| 2008/0069014 A1 | 3/2008 | Powell et al. | |
| 2008/0178243 A1* | 7/2008 | Dong et al. | 725/116 |
| 2008/0225841 A1 | 9/2008 | Conway et al. | |
| 2009/0180529 A1 | 7/2009 | Agazzi et al. | |

FOREIGN PATENT DOCUMENTS

| | | |
|---|---|---|
| EP | 1484876 | 12/2004 |
| EP | 1 494 407 | 1/2005 |
| GB | 2337672 | 11/1999 |
| WO | WO 00/31923 | 6/2000 |

OTHER PUBLICATIONS

Grow, "802.1 and Energy Efficient Ethernet", [Online] Sep. 11, 2007, pp. 1-6, http://www.ieee802.org/3/eee_study/public/sep07/grow_1_0907.pdf.

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.

Gupta et al., "Dynamic Ethernet Link Shutdown for Energy Conservation on Ethernet Links." IEEE, Jun. 24, 2007. XP002524616.

Wael Diab, "Energy Efficient Ethernet and 802.1." Nov. 2007. XP002524617.

* cited by examiner

METHOD AND SYSTEM FOR REDUCING TRANSCEIVER POWER VIA A VARIABLE SIGNAL CONSTELLATION

CROSS-REFERENCE TO RELATED APPLICATIONS/INCORPORATION BY REFERENCE

This patent application makes reference to, claims priority to and claims benefit from U.S. Provisional Patent Application Ser. No. 60/894,240 filed on Mar. 12, 2007.

This patent application also makes reference to, claims priority to and claims benefit from U.S. Provisional Patent Application Ser. No. 60/917,870 filed on May 14, 2007.

This application also makes reference to:
U.S. patent application Ser. No. 11/859,459 filed on Sep. 21, 2007;
U.S. patent application Ser. No. 11/859,482 filed on Sep. 21, 2007; and
U.S. patent application Ser. No. 11/859,385 filed on Sep. 21, 2007.

Each of the above stated applications is hereby incorporated herein by reference in its entirety.

FIELD OF THE INVENTION

Certain embodiments of the invention relate to networking. More specifically, certain embodiments of the invention relate to a method and system for reducing transceiver power via a variable signal constellation.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types, sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies enabling higher transmission rates over existing copper cabling infrastructures. Various efforts exist in this regard, including technologies that enable transmission rates that may even exceed Gigabits-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. However, with the increase in data rates more sophisticated signal processing is required. Additionally, higher data rates and more advanced circuitry may increase power consumption in networks and networking devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for reducing transceiver power via a variable signal constellation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for reducing transceiver power via a variable signal constellation. In this regard, an Ethernet PHY device may receive one or more signals indicative of a current state of an Ethernet link to which the PHY device is coupled and/or indicative of resources, such as power, available to the PHY device. Accordingly, a number of points comprising a signal constellation utilized to communicate data via the Ethernet link may vary based on the one or more signals. A current state of the link may comprise a bit error rate, a packet error rate, and/or utilization, in terms of bandwidth for example, of the link. Aspects of the invention may enable controlling, at least in part, power consumption of the PHY device by altering the number of points comprising the signal constellation. Accordingly, power consumed by the PHY device may be minimized by varying the signal constellation. Voltage levels to which data to be transmitted may be mapped may vary based on variations in the signal constellation. Packet error rates and/or bit error rates may be maintained via variations in the signal constellation. Variations in the signal constellation may be based on thresholds associated with on one or more of a bit error rate, a packet error rate, link utilization, and power available to said Ethernet transmitter. The Ethernet PHY device may be enabled to communicate at data rates of 1 Gbps and higher.

Figure 1:
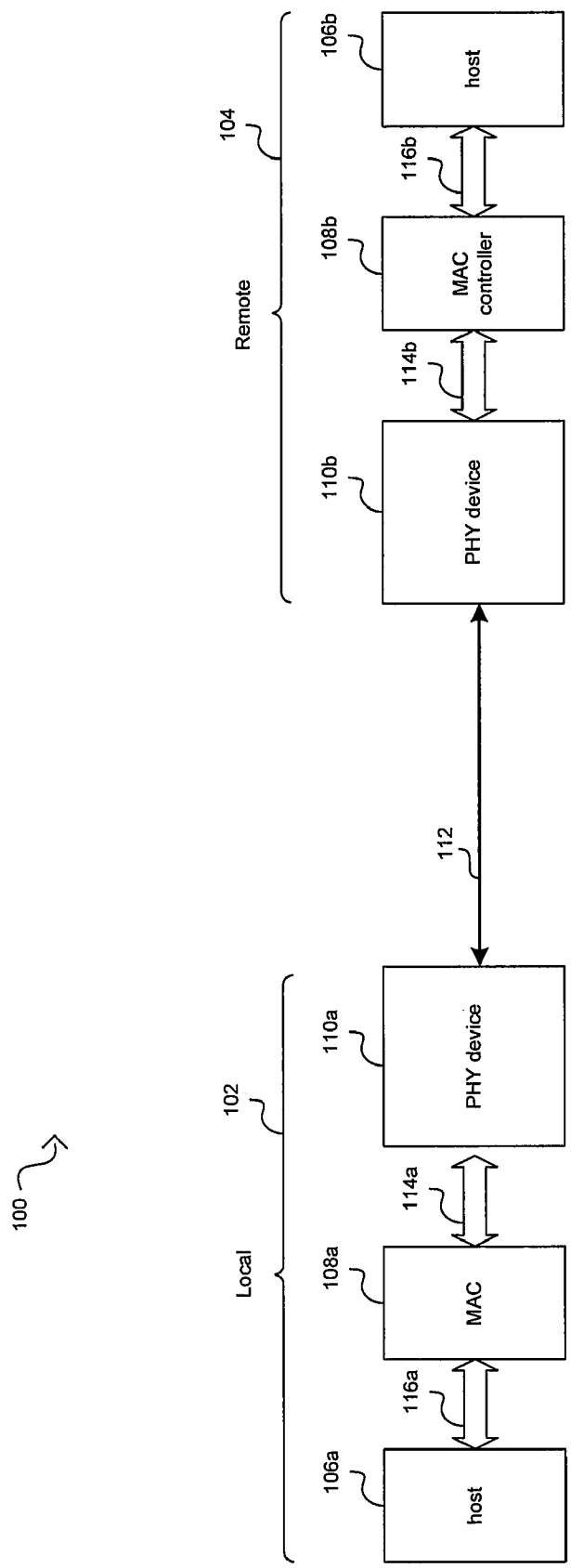
FIG. 1 is a block diagram illustrating an Ethernet connection between a local link partner and a remote link partner, in connection with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 communicate via a cable 112. The cable 112 may comprise up to four or more link, each of which may, for example, comprise an unshielded twisted pair (UTP). The local link partner 102 and the remote link partner 104 may communicate via two or more link comprising the cable 112. For example, Ethernet over twisted pair standards 10Base-T and 100Base-TX may utilize two pairs of UTP while Ethernet over twisted pair standards 1000Base-T and 10GBase-T may utilize four pairs of UTP.

The local link partner 102 may comprise a host 106a, a medium access control (MAC) controller 108a, and a PHY device 104a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (A/V) enabled equipment. In this regard, A/V equipment may, for example, comprise, a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode. In this regard, the PHY devices 110a and 110b may be enabled to select the fastest configuration supported by both. In various embodiments of the invention, the PHY devices 110a and 110b may comprise suitable logic, circuitry, and/or code that may enable transmission and/or reception at a high(er) data in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates.

PHY devices such as the PHY devices 110a and 110b may conventionally utilize multilevel signaling. For example, for 1 Gbps Ethernet, a PAM-5 transmission scheme may be utilized in each twisted-pair wire, where PAM-5 refers to a signal constellation with five levels (also referred to as constellation points) {−2, −1, 0, 1, 2}. In this regard, the set of 5 levels may, for example, correspond to link voltages of {−1V, −0.5V, 0V, +0.5V, +1V}. In this manner, high(er) data rates are achieved as each level transmitted may represent multiple bits. However, at times when link utilization is low(er) and/or when high(er) data rates are unnecessary, aspects of the invention may enable reducing power consumption in the network by reducing the number of constellation points. In this regard, low link utilization may refer, for example, to periods when a large percentage of one or more network resources, such as bandwidth or processing time, are unused. For example, for 1 Gbps Ethernet data rates may be as shown in EQ. 1, $$\frac{125\ Msps}{channel} \times \frac{2\ bits}{symbol} \times 4\ channels = 1\ Gbps \qquad \text{EQ. 1}$$

where Msps refers to mega (1000) symbols per second. Accordingly, during times when 1 Gbps is not needed, the signal constellation may be reduced/changed to {−1, 1} resulting in a one bit per symbol and a new data rate as shown below in EQ. 2.

$$\frac{125\ Msps}{channel} \times \frac{1\ bit}{symbol} \times 4\ channels = 0.5\ Gbps \qquad \text{EQ. 2}$$

In this manner, voltage may be reduced by up to a factor of 2 and the transmit power consumption may be reduced by up to a factor of 4.

In various embodiments of the invention, the number of constellation points may be determined based on bit or packet error rates on a link. For example, if bit error rates are too high, aspects of the invention may enable reducing the number of constellation points. In this regard, reducing the number of constellation points may ease signal processing requirements of an Ethernet transmitter and/ore a Ethernet receiver. Accordingly, aspects of the invention may enable controlling a bit and/or packet error rate by controlling the size of a signal constellation.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE signals that may be communicated between frames of data.

In an exemplary embodiment of the invention illustrated in FIG. 1, the hosts 106a and 106b may represent layer 3 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer adds its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate interfaces and/or media independent interfaces (MII). The bus controller interfaces 116a and 116b may correspond to PCI or PCI-X interfaces. Notwithstanding, the invention is not limited in this regard.

Figure 2:
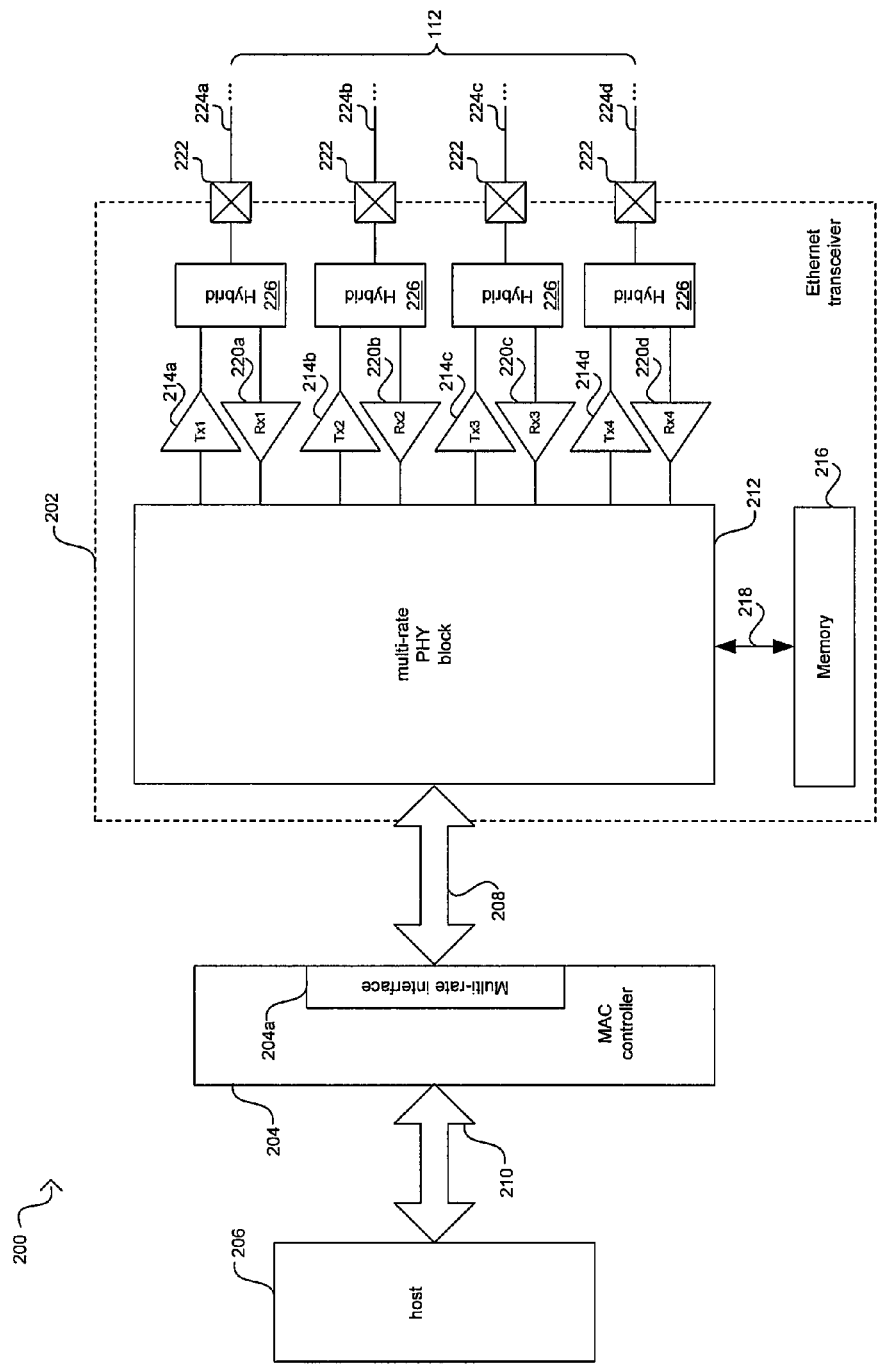
FIG. 2 is a block diagram illustrating an exemplary Ethernet over twisted pair PHY device architecture comprising a multi-rate physical block, in accordance with an embodiment of the invention.

FIG. 2 is a block diagram illustrating an exemplary Ethernet over twisted pair PHY device architecture comprising a multi-rate physical block, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a multi-rate physical layer block 212, one or more transmitters 214, one or more receivers 220, a memory 216, a memory interface 218, and one or more input/output interfaces 222.

The PHY device 202 may be an integrated device that comprises a multi-rate physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate interface 204a that may comprise suitable logic, circuitry, and/or code to enable communication with the PHY device 202 at a plurality of data rates via the interface 208.

The multi-rate physical layer block 212 in the PHY device 202 may comprise suitable logic, circuitry, and/or code that may enable operability and/or functionality of physical layer requirements. In this regard, the multi-rate physical layer block 212 may enable generating the appropriate link discovery signaling utilized for establishing communication with a remote PHY device in a remote link partner. In this regard, a 10base-T PHY device may transmit normal link pulses (NLPs) periodically. Similarly, during auto-negotiation, 100Base-TX, 1000Base-T, and 10Gbase-T PHY devices, for example, may transmit fast link pulse (FLP) bursts, where each burst comprises a train of NLPs. The multi-rate physical layer block 212 may communicate with the MAC controller 204 via the interface 208. In one aspect of the invention, the interface 208 may be a media independent interface (MII) and may be configured to utilize a plurality of serial data lanes for receiving data from the multi-rate physical layer block 212 and/or for transmitting data to the multi-rate physical layer block 212, in order to achieve higher operational speeds such as 1 Gbps or 10 Gbps, for example. The multi-rate physical layer block 212 may be configured to operate in one or more of a plurality of communication modes, where each communication mode may implement a different communication protocol. These communication modes may include, but are not limited to, Ethernet over twisted pair standards 10Base-T, 100Base-TX, 100Base-T, 10GBase-T, and other similar protocols that utilize multiple links between link partners. The multi-rate physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate physical layer block 212. The parameters may comprise configuration data and the code may comprise operational code such as software and/or firmware, but the information need not be limited in this regard. Moreover, the parameters may include adaptive filter and/or block coefficients for use by the multi-rate physical layer block 212, for example.

Each of the transmitters 214a, 214b, 214c, 214d may comprise suitable logic, circuitry, and/or code that may enable transmission of data from the link partner 200 to a remote link partner via, for example, the cable 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a link that may comprise the cable 112. In this manner, a transmitter/receiver pair may interface with each of the links 224a, 224b, 224c, 224d. In this regard, the transmitter/receiver pairs may be enabled to provide the appropriate communication rate and mode for each link.

The input/output interfaces 222 may comprise suitable logic circuitry, and/or code that may enable the PHY device 202 to impress signal information onto a physical medium comprising a link, for example a twisted pair link comprising the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium comprising the link. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. For example, the PHY device 202 may be enabled to transmit and receive data at 1 Gbps, 10 Gbps or higher. In this manner, the PHY device 202 may be 1GBASE-T and/or 10GBASE-T compliant. Accordingly, the link partner 200 may comprise a number of hybrids 226 corresponding to the number of physical links. Each hybrid 226 may comprise suitable logic, circuitry, and/or code that may enable separating transmitted and received signals from a physical link. Each hybrid 226 in the local link partner 300 may be communicatively coupled to an input/output interface 222.

In an exemplary embodiment of the invention, the link partner 200 may communicate with a remote link partner via the cable 112. For example, for 1 Gbps Ethernet the link partner 200 may transmit data to and receive data from a remote partner via the links 224a, 224b, 224c, and 224d. In this regard, when there is no data for the link partner 200 to transmit, then it may transmit IDLE signals to maintain synchronization with the remote link partner.

In operation, the link partner 200 may communicate with a remote partner via, for example, the cable 112. For example, the link partner 200 may transmit, for example, multimedia content to a remote partner via the link 224a and may receive control and/or auxiliary data associated with the multimedia content from the remote partner via the link 224b. In this regard, the link partner 200 may be enabled to utilize AVB for the transmission and/or reception of data over the links 224a and/or 224b. Additionally, the link partner may be enabled to transmit at a first data rate and receive at a second, possibly different, data rate. For example, the link partner 200 may transmit multimedia content via the link 224a at a data rate of 1 Gbps and may receive control data via the link 224b at a rate of 500 Mbps. In this manner, multimedia content may be transmitted utilizing a 5 point constellation and auxiliary and/or control data may be transmitted utilizing a 2 point constellation. Transmitting auxiliary and/or control data utilizing a reduced signal constellation may result in power savings for the link partner 200 and/or a remote link partner with which the link partner 200 may communicate.

Figure 3:
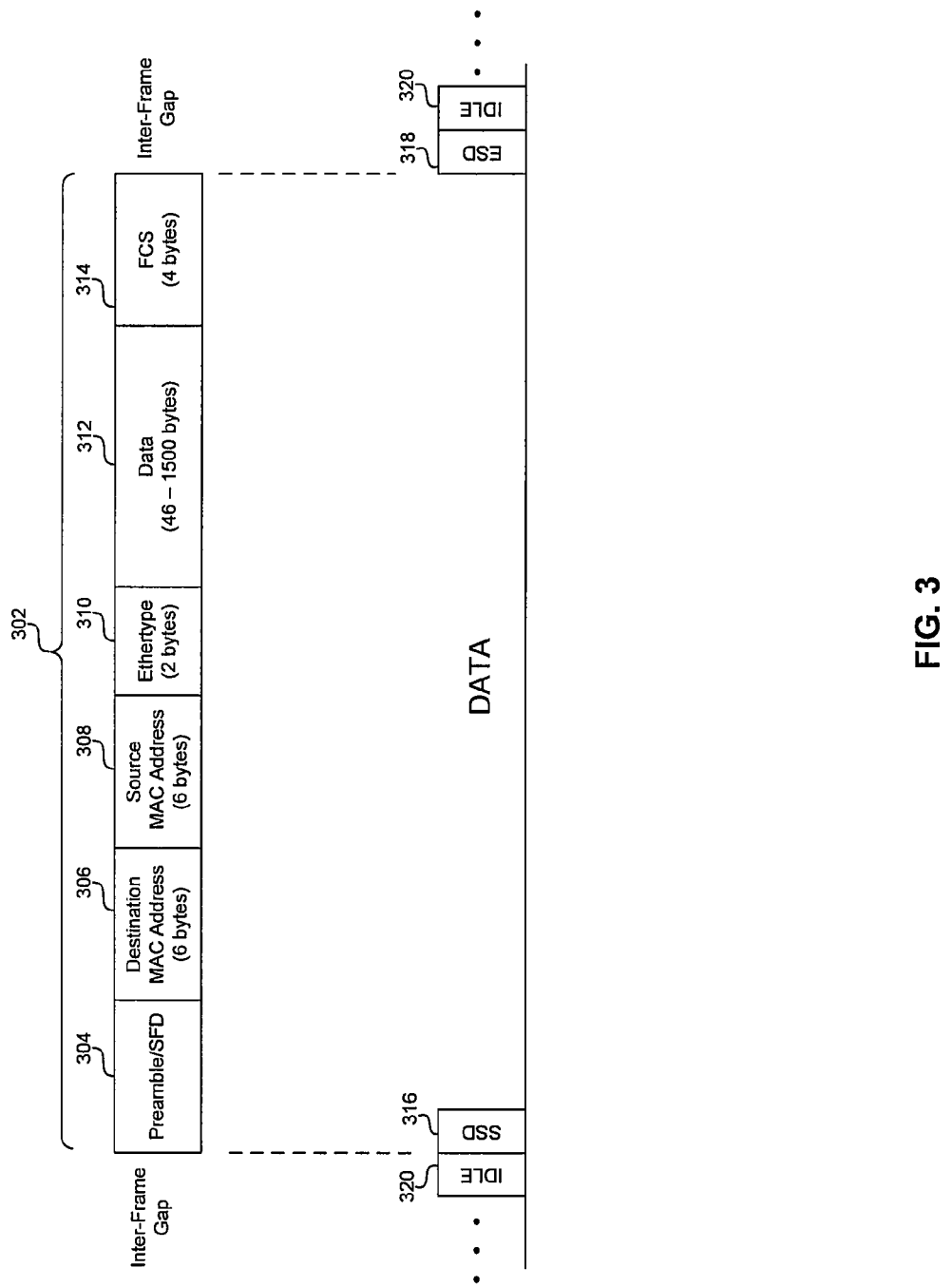
FIG. 3 is a diagram illustrating exemplary activity on an Ethernet link, in accordance with an embodiment of the invention.

FIG. 3 is a diagram illustrating exemplary activity on an Ethernet link, in accordance with an embodiment of the invention. Referring to FIG. 3, there is shown an exemplary Ethernet frame 302, preceded and followed by IDLE signals 320.

The Ethernet frame 302 may comprise a preamble 304, destination MAC address field 306, a source MAC address field 308, an Ethertype field 310, a data field 312, and a frame check sequence (FCS) 314.

The first 62 bits of the preamble may be utilized to phase lock a receiving PHY device to a transmitting PHY device. The last 2 bits of the preamble, '11', may indicate the end of the preamble and that the next bit received may be real data. The final byte of the preamble (the last 8 bits ending in '11') is also known as a start of frame delimiter (SFD) 316. In various exemplary embodiments of the invention, the first 8 bits of the preamble may be replaced with a start of stream delimiter (SSD) 316 to indicate the end of an inter-frame gap and the beginning of a frame.

The destination MAC address field 306 may comprise information that may be utilized to identify the node that the frame is to be sent to. The source MAC address 308 field may comprise information that may be utilized to identify the node that originated the frame. The Ethertype field 310 may comprise information that may be utilized to identify the protocol (e.g. IPv4 or IPv6) being transported in the packet. The data field 312 may contain the data being transmitted. The FCS 314 may comprise information that may be utilized to provide error detection for the packet. In various instances, the frame 302 may be immediately followed by an end of sequence delimiter (ESD) 318 to indicate the end of a frame and the beginning of an inter-frame gap.

In operation, Ethernet frames may be transmitted utilizing a variable number of constellation points. For example, when an amount of data stored in one or more buffers is below a threshold, aspects of the invention may enable reducing the number of constellation points utilized to transmit data. Similarly, when an amount of data stored in one or more buffers is above a threshold, for example, aspects of the invention may enable increasing the number of constellation points utilized to transmit data.

Figure 4:
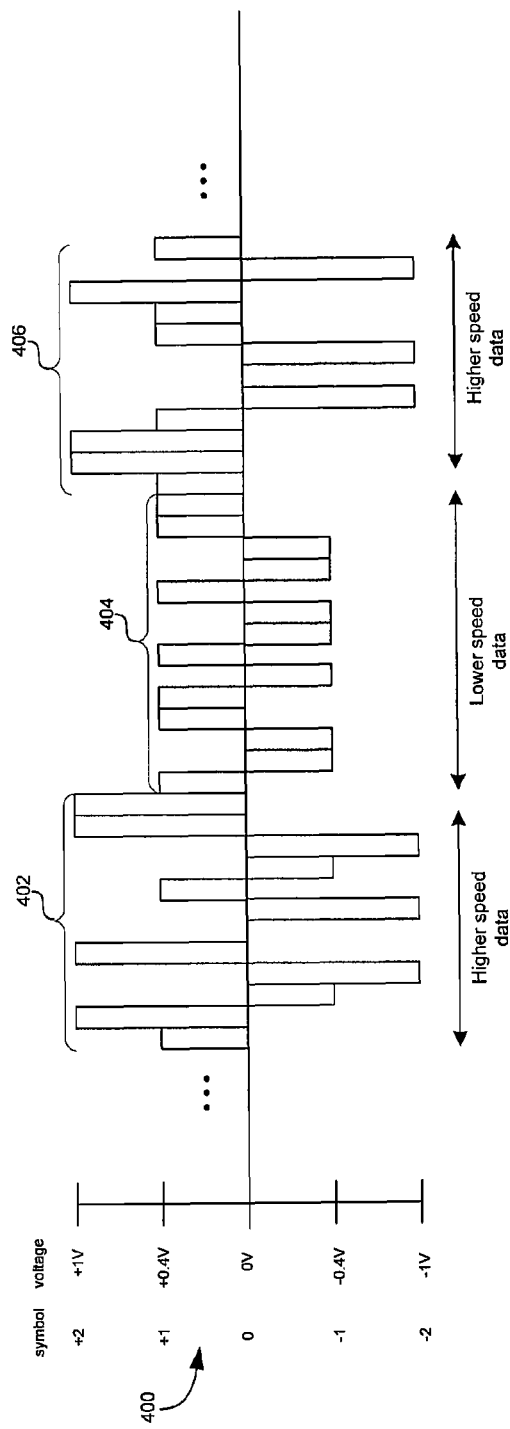
FIG. 4 is a block diagram illustrating transmission of signals utilizing a reduced symbol set, in accordance with an embodiment of the invention.

FIG. 4 is a block diagram illustrating transmission of signals utilizing a reduced a signal constellation, in accordance with an embodiment of the invention. Referring to FIG. 4 there is shown a data stream 400 comprising three intervals of data transmission 402, 404, and 406. The data stream 400 may be transmitted by a link partner such as the link partners 102 or 104 of FIG. 1. In this regard, each of the intervals of data 402, 404, and 406 may each comprise one or more Ethernet frames.

In 1 Gbps Ethernet, for example, PAM-5, with the levels (also referred to as signal constellation) $\{+2, +1, 0, -1, -2\}$, may be utilized for representing signals. In this regard, the set of points +2, +1, 0, −1, −2 may, for example, map to voltages +1V, +0.5V, 0V, −0.5V, and −1V, respectively. Consequently, points +2 and −2 may result in increased power consumption due to the higher voltage utilized to represent them. Accordingly, by representing signals with only the points $\{+1, -1\}$, aspects of the invention may enable reducing the power consumption in a network.

In the exemplary operation depicted in FIG. 4, during periods of high link utilization, such as intervals 402 and 406, data may be represented utilizing a 5 point constellation, and during periods of low link utilization, such as the interval 404, a 2 point constellation may be utilized. In this manner, aspects of the invention may be enabled to determine, for example, required data rates and adjust one or more signal constellations accordingly. For example, a link partner, such as the link partner 200 of FIG. 2 may be enabled to determine necessary data rates to prevent an overflowed buffer.

In another exemplary embodiment of the invention, aspects of the invention may enable reducing the signal constellation in response to power restrictions and/or limited availability of power. For example, in a wireless device, aspects of the invention may enable reducing the signal constellation in order to conserve power when, for example, the device is operating on battery power. In this manner, by controlling the size of a signal constellation, aspects of the invention may enable metering or controlling, at least in part, the power consumption of a PHY device or Ethernet transmitter. Additionally, various exemplary embodiments of the invention may use a combination of factors such as link utilization, error rates, and available power for determining an optimum signal constellation.

Although an example of 1 Gbps Ethernet with a typical 5 point constellation is provided, the original constellation size, the reduced constellation size, the original data rate, the reduced data rate, and/or other characteristics of a network and/or data transmission may differ without deviating from the scope of the invention.

Figure 5:
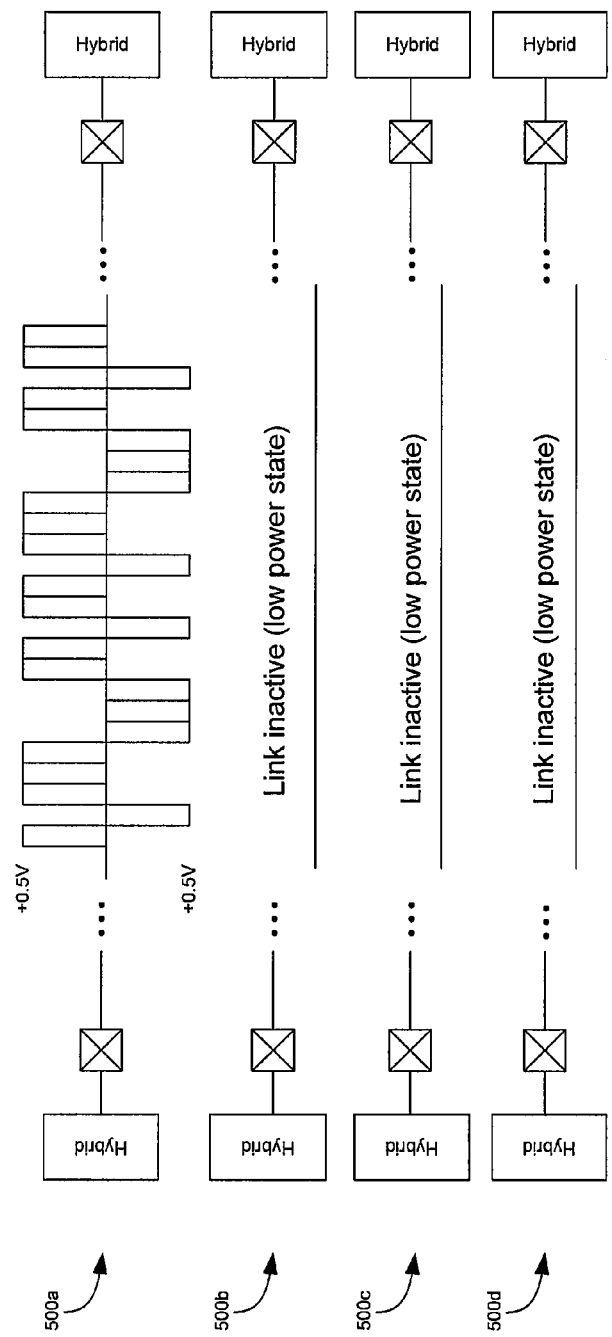
FIG. 5 is a diagram illustrating an exemplary system enabled for reduced power consumption during periods of low link utilization, in accordance with an embodiment of the invention.

FIG. 5 is a diagram illustrating an exemplary system enabled for reduced power consumption during periods of low link utilization, in accordance with an embodiment of the invention. Referring to FIG. 5 there is shown four physical links 500a, 500b, 500c, and 500d which may exist, for example, between two link partners such as the link partner 200 of FIG. 2.

In operation, high speed Ethernet, such as 1 Gbps, for example, may utilize a 5 point signal constellation (PAM5) on each of 4 transmission links (wire-pairs). For example, for 1 Gbps Ethernet, a transmitter may operate at 125 Msps (125000 symbols per second), with each symbol representing 2 bits of data. Accordingly, 4 links result in a data rate of 1 Gbps. However, in accordance with an embodiment of the invention, by using only 2 of the 5 constellation points, the data rate may be reduced from 1 Gbps to 500 Mbps, as shown in EQ. 1. Additionally, as depicted in FIG. 5, further power savings may be realized by reducing one or more links to a lower power or reduced activity state. For example, in the 1 Gbps system depicted, the data rate may be reduced to 250 Mbps by disabling or putting into a low(er) power state, 3 of the 4 links 500a, 500b, 500c, 500d. In various embodiments of the invention, links put into a low power state may transmit signals to maintain link status. In this regard, synchronization functions, equalization, automatic gain control, adaptive echo cancellation, or other signal processing operations may be maintained during low(er) power periods transmission so that a link partner may quickly transition between different data rates.

In various embodiments of the invention, a reduced set of constellation points may be chosen such that the overall bit error rate (BER) may not be impacted. For example, 1000Base-T may utilize subset partitioning as part of a Trellis Coded Modulation (TCM) scheme. If the 2 constellation points are chosen to be the center point for each subset, the overall BER may not be impacted. This may result in a reduced transmit voltage swing. Transmit power may be proportional (e.g. quadratically proportional) to transmit voltage swing. Utilizing only 2 of the 5 constellation points may thus require 4 times less power than utilizing 5 constellation points. In addition, utilizing only 1 of the 4 links at a time may result in additional power savings by enabling circuitry associated with the 3 inactive links to be powered down or brought to a low(er) power state. In various embodiments of the invention, the link(s) which are put into a low(er) power state may change with time. In this regard, FIG. 6 provides additional details of an exemplary embodiment which alternates links to be disabled or put into a low(er) power state.

Figure 6:
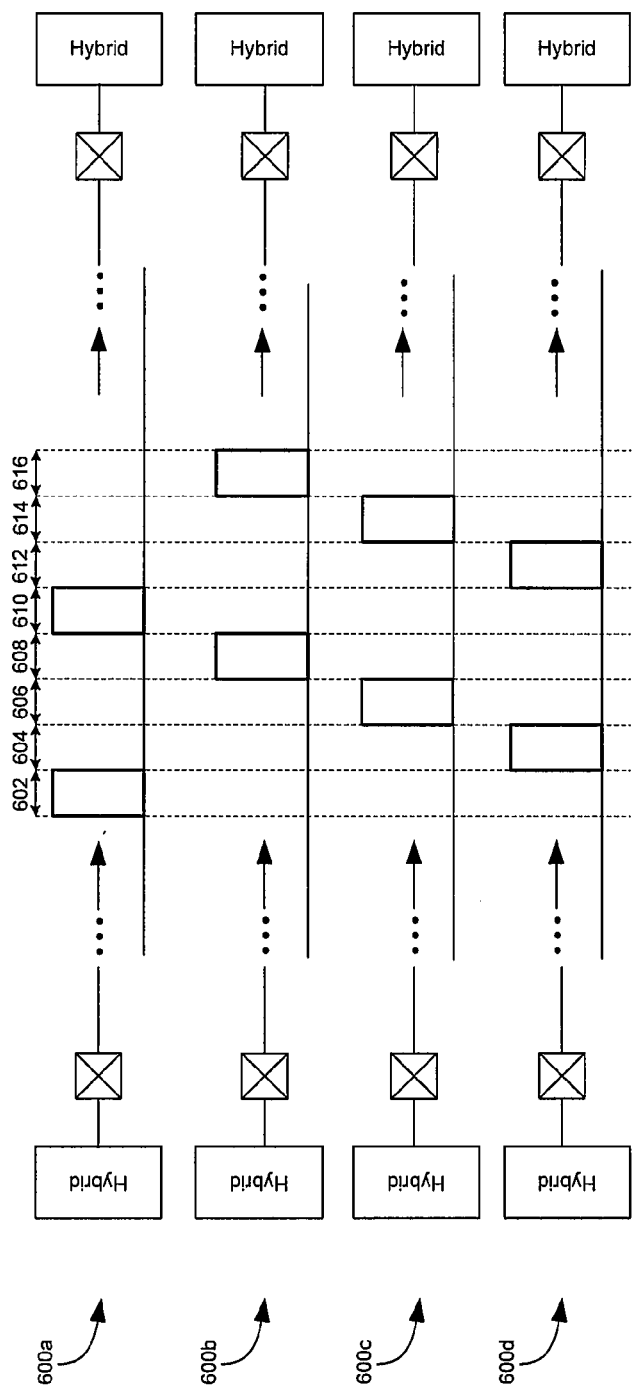
FIG. 6 is a diagram illustrating alternating link being placed in a low(er) power state, in accordance with an embodiment of the invention.

FIG. 6 is a diagram illustrating alternating links placed into a low(er) power state, in accordance with an embodiment of the invention. Referring to FIG. 6 there is activity on four links 600a, 600b, 600c, 600d during intervals 602 to 616.

In operation, one or more links comprising a cable, such as the cable 112 for example, may be disabled during periods of low(er) link activity. In the exemplary embodiment depicted, 3 of the 4 links 600a, 600b, 600c, 600d may be disabled or reduced to a low(er) power state and actual data may be transmitted on a reduced number of links during a time interval. For example, data may be transmitted on the link 600b during the interval 616, the link 600c during the interval 614, the link 600d during the time interval 612, and so forth. In this manner, the length of the intervals 602-616 may be chosen such that a minimum period of inactivity for each of the links 600a, 600b, 600c, and 600d may be maintained at less than a determined amount of time. In this manner, the length of the intervals 602 to 616 may be chosen such that each of the links 600a, 600b, 600c, and 600d is able to maintain synchronization and/or other parameters necessary for the rapid transition to a higher data rate.

Figure 7:
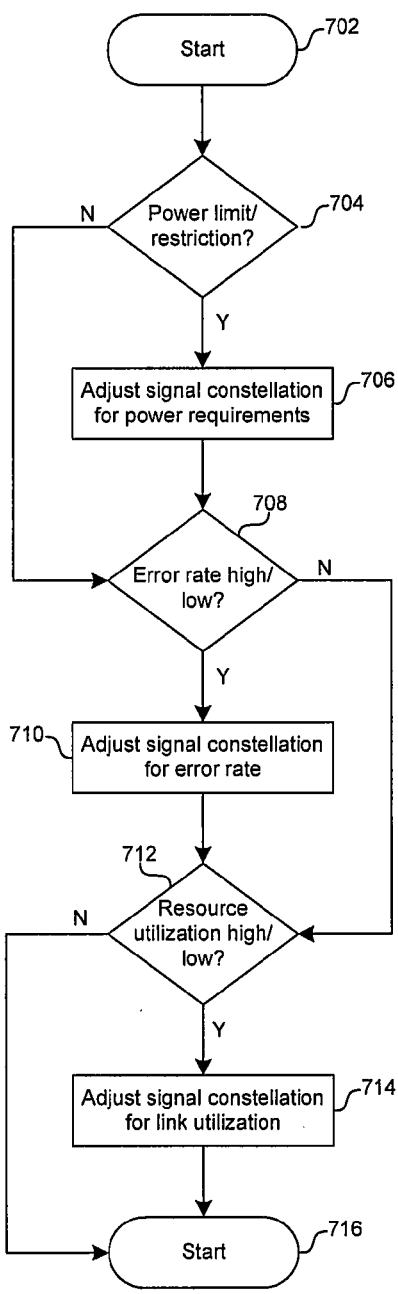
FIG. 7 is a flow chart illustrating exemplary steps which may be utilized to control a signal constellation utilized for transmitting data in a network, in accordance with an embodiment of the invention.

FIG. 7 is a flow chart illustrating exemplary steps which may be utilized to control a signal constellation utilized for transmitting data in a network, in accordance with an embodiment of the invention. Referring to FIG. 7 the exemplary steps may begins with start step 702. Subsequent to step 702, the exemplary steps may advance to step 704. In step 704, it may be determined whether power consumption of an Ethernet transmitter is between determined limits. In this regard, if power consumption is higher or lower than determined threshold(s), then the exemplary steps may advance to step 706. In step 706, a signal constellation may be adjusted based on power constraints and/or desired power consumption. For example, when an Ethernet transmitter is running on battery power a signal constellation comprising fewer points may be utilized as compared to when the transmitter is plugged into a wall outlet.

Subsequent to step 706, the exemplary steps may advance to step 708. In step 708, it may be determined whether bit error rates and/or packet error rates on a link are too high or too low. Accordingly, it may be desirable to alter an error rate by adjusting a signal constellation and the exemplary steps may advance to step 710. In step 710, the number of points comprising a signal constellation may be reduced in order to reduce error rates on an Ethernet link. Conversely, if higher error rates may be tolerated in exchange for increased data rates, then the number of points comprising a signal constellation may be increased. Subsequent to step 710, the exemplary steps may advance to step 712. In step 712 it may be determined whether link utilization is between determined limits. In this regard, if link utilization is either too high or too low, the exemplary steps may advance to step 714.

In step 714, if link utilization is below a threshold, then the number of points comprising a signal constellation may be reduced. Conversely, if link utilization is above a threshold, then the number of points comprising a signal constellation may be increased. Subsequent to step 714 the exemplary steps may advance to an "end" step 716. In this regard, a determination and/or adjustment of a signal constellation may be complete. Retuning to step 704, if power consumption is not within determined limits, then the exemplary steps may advance to the previously described step 708. Returning to step 708, if error rates on a link are outside of desired limits, then the exemplary steps may advance to the previously described step 712. Returning to step 712, if link utilization is within determined limits, then the exemplary steps may advance to the previously described step 716.

Aspects of a method and system for reducing transceiver power via a variable signal constellation are provided. In this regard, an Ethernet PHY device, such as the device 202, may receive one or more signals indicative of a current state of an Ethernet link, such as the link 224a, to which the PHY device is coupled and/or indicative of resources, such as power, available to the PHY device. Accordingly, a number of points comprising a signal constellation utilized to communicate data via the Ethernet link may vary based on the one or more signals. A current state of the link may comprise a bit error rate, a packet error rate, and/or utilization, in terms of bandwidth for example, of the link. Aspects of the invention may enable controlling, at least in part, power consumption of the PHY device by altering the number of points comprising the signal constellation. Accordingly, power consumed by the PHY device may be minimized by varying the signal constellation. Voltage levels to which data to be transmitted may be mapped, such as the voltages depicted in FIG. 4, may vary based on variations in the signal constellation. Packet error rates and/or bit error rates may be maintained via variations in the signal constellation. Variations in the signal constellation may be based on thresholds associated with on one or more of a bit error rate, a packet error rate, link utilization, and power available to said Ethernet transmitter. The Ethernet PHY device may be enabled to communicate at data rates of 1 Gbps and higher.

Another embodiment of the invention may provide a machine-readable storage, having stored thereon, a computer program having at least one code section executable by a machine, thereby causing the machine to perform the steps as described herein for reducing transceiver power via a variable signal constellation Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, the method comprising:
   performing using one or more circuits and/or processors in an Ethernet-over-twisted-pair PHY, said Ethernet-over-twisted-pair PHY being coupled to a link partner via a plurality of twisted pairs:
   determining, based on one or more signals, one or both of:
      a current state of a link between said Ethernet-over-twisted-pair PHY and said link partner; and
      resources available to said Ethernet-over-twisted-pair PHY; and
   varying a number of constellation points utilized by said Ethernet-over-twisted-pair PHY for communicating over said plurality of twisted-pairs based on said determination, wherein:
      said number of constellation points is varied while continuing to communicate over each of said plurality of twisted pairs; and
      said number of constellation points is varied while a symbol rate at which said Ethernet-over-twisted-pair PHY remains unchanged.

2. The method according to claim 1, wherein said resources available to said Ethernet-over-twisted-pair PHY comprise power.

3. The method according to claim 1, wherein said current state of said link between said Ethernet-over-twisted-pair PHY and said link partner comprises a bit error rate, a packet error rate and/or a utilization of said link.

4. The method according to claim 1, comprising controlling power consumption of said Ethernet-over-twisted-pair PHY via said variation in said number of constellation points utilized by said Ethernet-over-twisted-pair PHY.

5. The method according to claim 4, wherein said controlling of said power consumption results in minimizing of power consumed by said Ethernet-over-twisted-pair PHY.

6. The method according to claim 1, comprising mapping data to be transmitted by said Ethernet Ethernet-over-twisted-pair PHY to varying voltage levels based on said variation in said number of constellation points.

7. The method according to claim 1, comprising maintaining a specified bit error rate via said variation in said number of constellation points.

8. The method according to claim 1, comprising maintaining a specified packet error rate via said variation in said number of constellation points.

9. The method according to claim 1, comprising modifying said number of constellation points utilized by said Ethernet-over-twisted-pair PHY based on a threshold associated with on one or more of a bit error rate, a packet error rate, link utilization, and power available to said Ethernet-over-twisted-pair PHY.

10. The method according to claim 1, wherein said Ethernet-over-twisted-pair PHY communicates at data rates greater than or equal to 1 Gigabit per second.

11. A non-transitory machine-readable storage having stored thereon, a computer program having at least one code section for providing communication in a network, the at least one code section being executable by a machine for causing the machine to perform steps comprising:
   in an Ethernet-over-twisted-pair PHY coupled to a link partner via a plurality of twisted pairs:
      determining, based on one or more signals, one or both of
         a current state of a link between said Ethernet-over-twisted-pair PHY and said link partner; and resources available to said Ethernet-over-twisted-pair PHY; and varying a number of constellation points utilized by said Ethernet-over-twisted-pair PHY for communicating over said plurality of twisted-pairs based on said determination, wherein:

said number of constellation points is varied while continuing to communicate over each of said plurality of twisted pairs; and said number of constellation points is varied while a symbol rate at which said Ethernet-over-twisted-pair PHY remains unchanged.

12. The non-transitory machine-readable storage according to claim 11, wherein said resources available to said Ethernet-over-twisted-pair PHY comprise power.

13. The non-transitory machine-readable storage according to claim 11, wherein said current state of said link between said Ethernet-over-twisted-pair PHY and said link partner comprises a bit error rate, a packet error rate and/or utilization of said link.

14. The non-transitory machine-readable storage according to claim 11, wherein said at least one code section comprises code for controlling power consumption of said Ethernet-over-twisted-pair PHY via said variation in said number of constellation points utilized by said Ethernet-over-twisted-pair PHY.

15. The non-transitory machine-readable storage according to claim 14, wherein said controlling of said power consumption causes minimizing of power consumed by said Ethernet-over-twisted-pair PHY.

16. The non-transitory machine-readable storage according to claim 11, wherein said at least one code section comprises code for mapping data to be transmitted by said Ethernet-over-twisted-pair PHY to varying voltage levels based on said variation in said number of constellation points.

17. The non-transitory machine-readable storage according to claim 11, wherein said at least one code section comprises code for maintaining a specified bit error rate via said variation in said number of constellation points.

18. The non-transitory machine-readable storage according to claim 11, wherein said at least one code section comprises code for maintaining a specified packet error rate via said variation in said number of constellation points.

19. The non-transitory machine-readable storage according to claim 11, wherein said at least one code section comprises code for modifying said number of constellation points utilized by said Ethernet-over-twisted-pair PHY based on a threshold associated with on one or more of a bit error rate, a packet error rate, link utilization, and power available to said Ethernet-over-twisted-pair PHY.

20. The non-transitory machine-readable storage according to claim 11, wherein said Ethernet-over-twisted-pair PHY communicates at data rates greater than or equal to 1 Gigabit per second.

21. A system for providing communication in a network, the system comprising:

one or more circuits and/or processors of an Ethernet-over-twisted-pair PHY, said Ethernet-over-twisted-pair PHY being coupled to a link partner via a plurality of twisted pairs, and said one or more circuits being operable to:

determine, based on one or more signals, one or both of:

a current state of a link between said Ethernet-over-twisted-pair PHY and said link partner; and resources available to said Ethernet-over-twisted-pair PHY; and vary a number of constellation points utilized by said Ethernet-over-twisted-pair PHY for communicating over said plurality of twisted-pairs based on said determination, wherein:

said number of constellation points is varied while continuing to communicate over each of said plurality of twisted pairs; and said number of constellation points is varied while a symbol rate at which said Ethernet-over-twisted-pair PHY remains unchanged.

22. The system according to claim 21, wherein said resources available to said Ethernet-over-twisted-pair PHY comprise power.

23. The system according to claim 21, wherein said current state of said at least said link between said Ethernet-over-twisted-pair PHY and said link partner comprises a bit error rate, a packet error rate and/or utilization of said link.

24. The system according to claim 21, wherein said one or more circuits and/or processors are operable to control power consumption of said Ethernet-over-twisted-pair PHY via said variation in said number of constellation points utilized by said Ethernet-over-twisted-pair PHY.

25. The system according to claim 24, wherein said controlling of said power consumption results in minimizing of power consumed by said Ethernet-over-twisted-pair PHY.

26. The system according to claim 21, wherein said one or more circuits and/or processors are operable to map data to be transmitted by said Ethernet-over-twisted-pair PHY to varying voltage levels based on variation in said variation in said number of constellation points.

27. The system according to claim 21, wherein said one or more circuits and/or processors are operable to maintain a specified bit error rate via said variation in said number of constellation points.

28. The system according to claim 21, wherein said one or more circuits and/or processors are operable to maintain a specified packet error rate via said variation in said number of constellation points.

29. The system according to claim 21, wherein said one or more circuits and/or processors are operable to modify said number of constellation points utilized by said Ethernet-over-twisted-pair PHY based a threshold associated with on one or more of a bit error rate, a packet error rate, link utilization, and power available to said Ethernet-over-twisted-pair PHY.

30. The system according to claim 21, wherein said Ethernet-over-twisted-pair PHY communicates at data rates greater than or equal to 1 Gigabit per second.

* * * * *